United States Patent [19]
Lengen et al.

[11] Patent Number: 4,882,007
[45] Date of Patent: Nov. 21, 1989

[54] ROBOT SYSTEM FOR FORMING A STRUCTURAL COMPONENT OF A PREIMPREGANTED FIBER REINFORCED TAPE

[75] Inventors: Wilhelm Lengen, Rosengarten; Rudolf Oberfranz, Buchholz; Wolfgang Puritz, Buxtehude, all of Fed. Rep. of Germany

[73] Assignee: Messerschmitt-Boelkow-Blohm GmbH, Munich, Fed. Rep. of Germany

[21] Appl. No.: 204,995

[22] Filed: Jun. 8, 1988

Related U.S. Application Data

[63] Continuation of Ser. No. 43,083, Apr. 27, 1987, abandoned.

[30] Foreign Application Priority Data

Apr. 28, 1986 [DE] Fed. Rep. of Germany ....... 3614365

[51] Int. Cl.$^4$ ............................................. B31D 1/00
[52] U.S. Cl. .................................. 156/523; 156/574; 901/41; 901/45
[58] Field of Search ............... 156/574, 577, 350, 353, 156/527, 523, 361; 83/597, 564, 342, 552, 553; 901/41, 43, 50, 45

[56] References Cited

U.S. PATENT DOCUMENTS

| | | | |
|---|---|---|---|
| 3,574,040 | 4/1971 | Chitwood et al. | 156/522 |
| 3,859,879 | 1/1975 | Spengler | 83/342 X |
| 4,060,016 | 11/1977 | Gerber | 83/552 X |
| 4,414,750 | 11/1983 | Defazio | 901/45 X |
| 4,460,433 | 7/1984 | Boyd | 156/574 |
| 4,512,837 | 4/1985 | Sarh et al. | 156/189 |
| 4,518,307 | 5/1985 | Bloch | 901/45 X |
| 4,522,679 | 6/1985 | Funakoski et al. | 83/564 X |
| 4,524,556 | 6/1985 | Sarh et al. | 52/807 |
| 4,599,036 | 7/1986 | Tarbuck | 901/45 X |
| 4,696,707 | 9/1987 | Lewis et al. | 156/574 X |

Primary Examiner—David Simmons
Attorney, Agent, or Firm—W. G. Fasse; D. H. Kane, Jr.

[57] ABSTRACT

Preimpregnated fiber reinforced tapes, so-called prepregs, are dispensed and deposited in a molding and bonding apparatus by a device in which a supply spool or roller carrying the tape is supported by a carrier having an adapter for connection to an arm of a conventional industrial robot. The carrier also supports feed rollers for advancing the tape and a cutter for cutting the tape. The feed rollers are secured to a support which in turn is secured to a fixed member by guide elements and biasing springs for a vertical guiding of the support movement. All drive members are controllable, so that all functions can be performed under the control of a computer in accordance with a program stored in the computer. Thus, the tape dispensing, application, and cutting takes place substantially automatically.

5 Claims, 4 Drawing Sheets

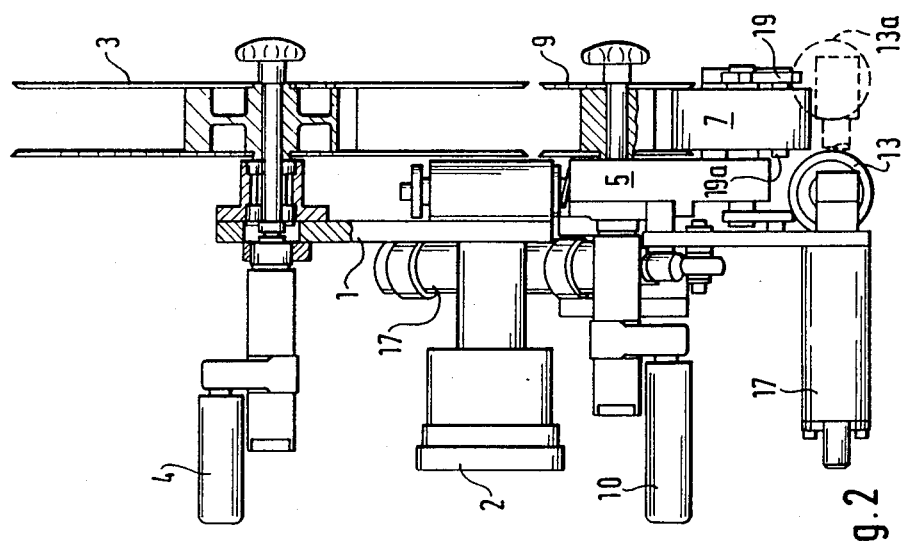
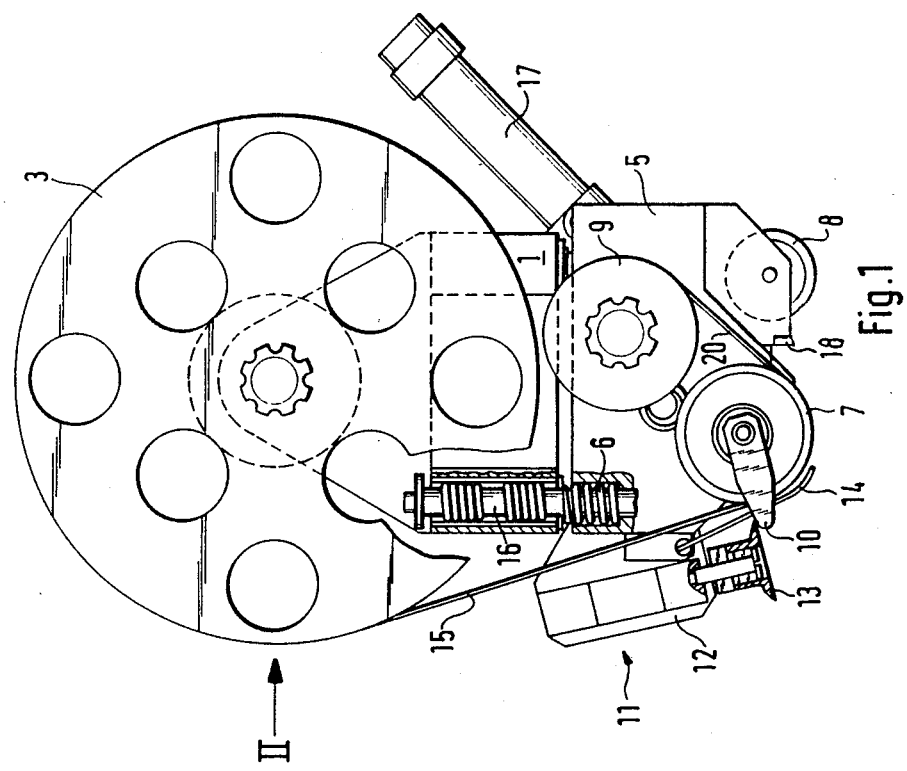

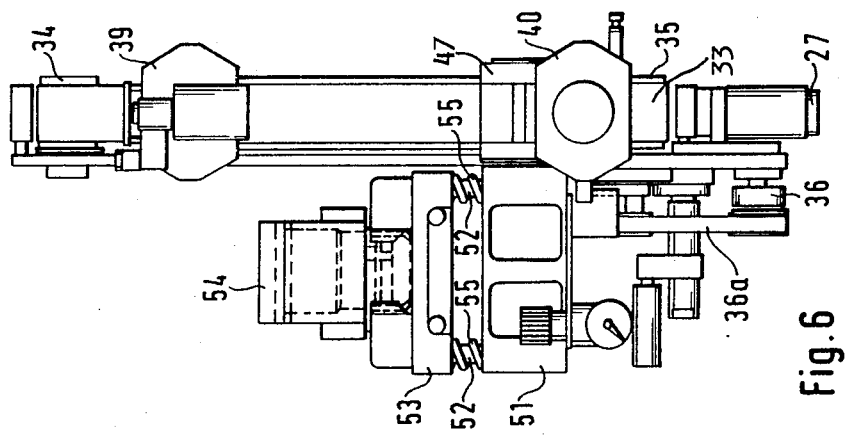
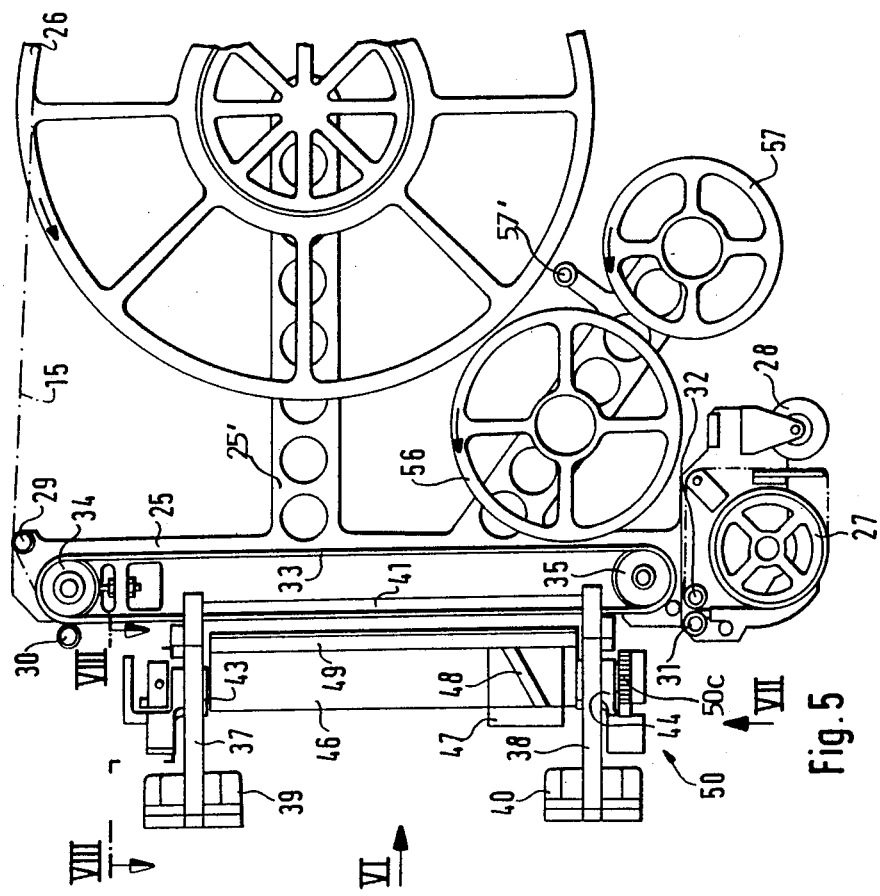

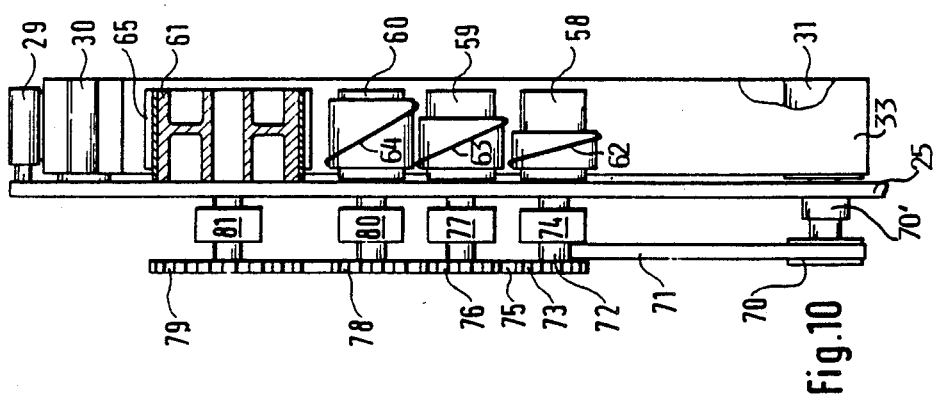
Fig. 10
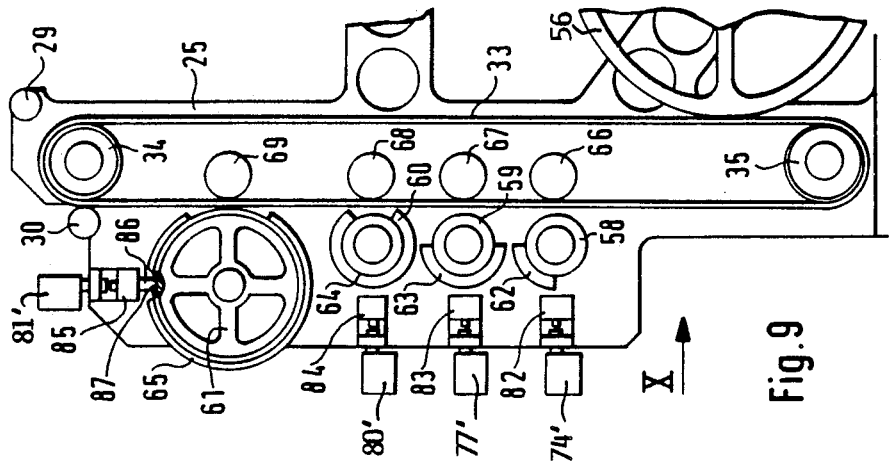
Fig. 9
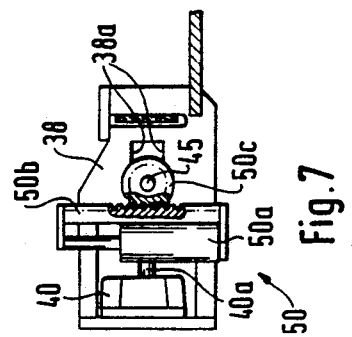
Fig. 7
Fig. 8

ROBOT SYSTEM FOR FORMING A STRUCTURAL COMPONENT OF A PREIMPREGANTED FIBER REINFORCED TAPE

This application is a continuation of application Ser. No. 043,083, filed Apr. 27, 1987, now abandoned.

FIELD OF THE INVENTION

The invention relates to a robot system for dispensing preimpregnated fiber reinforced tape or the like for use in a molding and bonding apparatus, for example, for producing large structural components such as aircraft bodies or aircraft wings or the like.

DESCRIPTION OF THE PRIOR ART

U.S. Pat. Nos. 4,512,837 (Sarh et al) and 4,524,556 (Sarh et al) corresponding to German Patent No. (DE-PS) 3,003,552, describe a system including a method and an apparatus for manufacturing large surface structural components, especially for aircraft, by using preimpregnated fiber reinforced tapes which are laminated to a frame structure and bonded, by curing, to each other and to the frame structure. Such a system operates to a large extent automatically with the aid of industrial robots as shown, for example, in FIG. 13 of these U.S. Patents. The grid or frame structure is made of ribs having an I-cross-section and extending lengthwise and crosswise and the formation of these frame structures is largely automated. However, the application of the preimpregnated fiber reinforced tapes to the frame or grid structure requires a manual operation. Such manual application is limited in its speed and hence consumes a substantial number of man-hours, thereby driving up the manufacturing costs. Additionally, the manual application of the tapes is frequently not precise enough.

OBJECTS OF THE INVENTION

In view of the foregoing it is the aim of the invention to achieve the following objects singly or in combination:

to provide a dispenser for preimpregnated, fiber reinforced tapes, so-called prepregs, which is capable of supplying these tapes substantially automatically to a molding apparatus, for example, for an automatic application of the tapes to a grid structure to laminate these tapes onto the grid structure;

to construct the dispenser in such a way that it can be attached to an arm of an industrial robot; and to construct the drive means of the tape dispenser in such a way that they may be controlled in response to a program stored in a computer which may also control the industrial robot.

SUMMARY OF THE INVENTION

The prepreg tape dispenser according to the invention is characterized in that a carrier frame supporting a supply reel for the tape is equipped with an adapter for attaching the dispenser to a robot such as the arm of an industrial robot. A tool support carries at least one feed roller for the tape and at least one cutting unit for severing portions from the continuous tape as it is dispensed by the supply reel. The support is mounted to the carrier frame or to an intermediate member by vertical guide elements and biasing spring members are inserted between the carrier frame or intermediate member and the tool support for biasing the tool support in such a way that the springs oppose a reduction in the distance between the carrier frame or intermediate member and the support. Further, all drive members, for example, for the feed rollers, for the cutting means, and so forth, are controllable in response to control signals, for example, provided by a control computer which in turn operates in accordance with a stored program and which may also control the robot.

The combination of these features according to the invention makes the tape supply substantially automatic, whereby the manufacturing costs, especially the man-hour costs, are substantially reduced. Simultaneously, the manufacturing precision is increased because the robot arm can locate the dispenser in a very precise manner for a stepwise or continuous tape dispensing and cutting.

BRIEF DESCRIPTION OF THE DRAWINGS

In order that the invention may be clearly understood, it will now be described, by way of example, with reference to the accompanying drawings, wherein:

FIG. 1 is a side view of the dispenser according to the invention in which the tape is cut by a rotatable disk knife;

FIG. 2 is a view in the direction of the arrow II in FIG. 1, and partially in section;

FIG. 5 illustrates a side view of another embodiment of a dispenser according to the invention in which the tape is cut by a knife carried on a knife bar which is rotatable about its longitudinal axis;

FIG. 6 is a view of the embodiment of FIG. 5, taken in the direction of the arrow VI in FIG. 5;

FIG. 7 is a view in the direction of the arrow VII in FIG. 5;

FIG. 8 is a view in the direction of the arrow VIII in FIG. 5;

FIG. 9 illustrates a partial view of a modified cutting mechanism in which the knife rollers carry helically curved knives for cutting a moving tape; and FIG. 10 is a view in the direction of the arrow X in FIG. 9.

Figure 3:
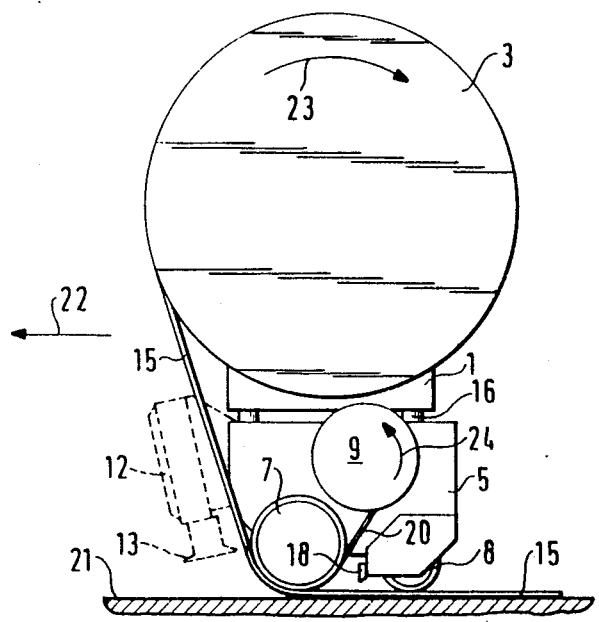
FIG. 3 is a side view similar to that of FIG. 1, but showing the dispenser as it dispenses a length of tape.

DETAILED DESCRIPTION OF PREFERRED EXAMPLE EMBODIMENTS AND OF THE BEST MODE OF THE INVENTION

FIGS. 1 and 2 illustrate an embodiment of the present dispenser in which the prepreg tape 15 is pulled off a supply reel 3 rotatably mounted on a carrier frame 1. An adapter 2 secured at one end thereof to the carrier frame 1 permits attaching the dispenser to the arm of an industrial robot such as shown in the above two U.S. Pat. Nos. to Sarh et al. A drive member such as a compressed air motor 4 mounted to the frame 1 drives the supply reel 3 for dispensing tape 15.

A tool support member 5 is operatively secured to the lower end of the frame 1 by means of mounting guide rods 16. The lower end of each mounting guide rod 16 is rigidly secured to the tool support 5. The upper end of each rod is movably held, for example by a ball box, in the frame structure 1. A spring 6 is mounted so that it is effective between the frame 1 and the tool support 5. As shown, the spring 6 surrounds a portion of the guide rod 16 and bears with one end against the support 5 and with its other end against the frame 1 thereby tending to push the support 5 away from the frame 1 and to oppose a movement of the support 5 toward the frame 1. A flange at the upper end of each guide rod 16 limits the spacing between the support 5 and the frame 1.

Figure 4:
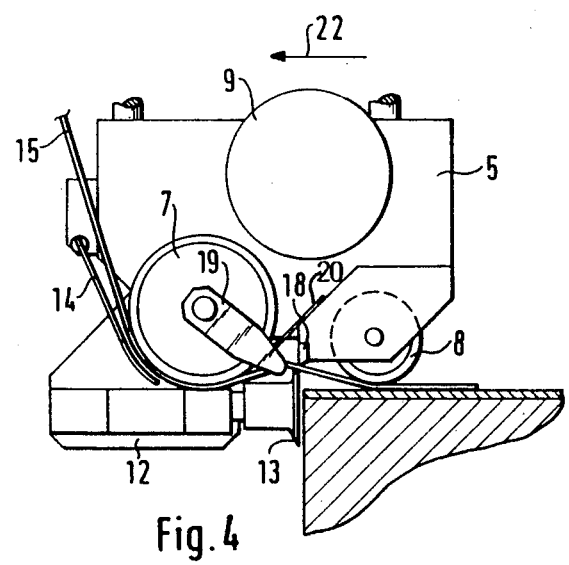
FIG. 4 shows the severing of a length of tape when the application of that length or portion is completed.

The tool support 5 carries two rollers 7 and 8 for feeding, guiding, and pressing the tape 15 against a structural component being manufactured and shown at 21 in FIG. 3. If the prepreg tape is provided with a backing strip 20, a take-up roller 9 driven by a drive member 10, such as a compressed air motor, is provided for rolling-up the backing strip 20 as it is being separated from the tape 15. A cutting unit 11 is also attached for a tilting movement to the tool carrier 5. The cutting unit 11 comprises substantially a knife carrier 12 and a rotatable cutting disk 13 secured to the knife carrier 12, as well as a stripping and guide blade 14 for the tape 15. A piston cylinder device 17 mounted to the tool support 5 drives the cutting unit and thus the disk knife 13 across the tape 15 into the dash-dotted knife end position 13a shown in FIG. 2. The cutting unit 11 with its knife carrier 12 is also tiltable from the dashed line position shown in FIG. 3 into the cutting position shown in FIG. 4. This movement can also be derived from the compressed air piston cylinder device 17. As shown in FIG. 4, in the cutting position the knife disk 13 cooperates with a counter cutting edge 18 held in a stationary position by the tool carrier 5. Thus, the knife disk 13 and the counter edge 18 cooperate in severing a portion of the tape 15. Once a portion is severed, the robot arm moves the dispenser back into a starting position for a repeated dispensing. As the cutting unit 11 is being tilted, a lever 19 carrying a pin 19a is tilted simultaneously for properly guiding the tape 15.

Referring to FIG. 3, the robot arm moves the dispenser from right to left as indicated by the arrow 22 for dispensing a length of tape 15, whereby one or several tape layers may be applied to a structural component 21 located in a molding apparatus as described in the above mentioned two U.S. Patents. The robot arm brings the dispenser into a starting position determined by a program in a control computer and presses the rollers 7 and 8 against the molding apparatus to thereby firmly press the tape 15 against a grid structure 21. Thus, the tape which at this point is still rather sticky since it has not been cured, adheres to the frame structure or to a previously laid down layer of tape 15. As the robot arm moves the dispenser in the direction of the arrow 22, tape is unreeled from the supply roller 3 and deposited as described in accordance with program steps. During this dispensing and depositing of tape the motor 4 applies a torque moment to the supply reel 3 as indicated by the arrow 23 to make sure that the tape that is being dispensed is sufficiently taut to avoid wrinkling. A motor 10 drives the take-up roller 9 for winding up the backing strip 20. When the end of a layer is reached, as shown in FIG. 4, the movement in the direction of the arrow 22 is stopped and the cutting is performed at the end of a layered section on a structural component 21. At this point the knife carrier 12 and its disk knife 13 are moved into the position shown in FIG. 4 by the piston cylinder device 17 which is operated, for example, by a magnetic valve not shown, whereby the pin 19a of the arm 19 properly presents the tape to the knife 13 and edge 18. Thereafter, the piston cylinder device 17 moves the cutting mechanism crosswise relative to the length of the tape for the severing by rolling the knife 13 along the edge 18 for a clean cut of the tape 15. The guide blade 14 makes sure that even after the severing the remaining or free end of the tape 15 remains attached to the end of the pressed down roller 7. The just described operation is repeated as often as is required for laying the prescribed number of tape layers onto the structural component until the intended thickness of the laminate structure is achieved.

Incidentally, the supply reel 3 and the take-up roller 9 may be constructed as a cassette type unit which is easily exchanged when the supply of tape is exhausted. Additionally, the used up backing strip present on the take-up roller 9 when the supply of tape on the reel 3 has been exhausted, may be removed and the cassette may be replenished with a fresh tape supply. In any event, the replacing of an empty cassette by a full cassette may be quickly done either by an operator or even by the robot.

FIGS. 5 and 6 show another embodiment of a preimpregnated tape dispenser, wherein the cutting operation may be performed by any one of a number of selectable knives supported on a rotatable knife bar 46. In this embodiment a tool support 51 and a carrier frame 25 form a unit constructed for attachment to a robot arm, not shown, through an intermediate member and an adapter 54. The tool support 51 is connected to the intermediate member 53 in the same manner as the tool support 5 in FIG. 1 is connected to the frame 1, as will be described in more detail below. A tape supply reel 26 is rotatably mounted on an arm 25' of the frame 25. Press down rollers 27 and 28 function in the same manner as the rollers 7 and 8 in the above described first embodiment. Guide rollers 29, 30, 31, and 32 guide the tape on its way from the reel 26 to the press down rollers 27, 28. A conveyor comprising an endless conveyor belt 33 is arranged on rollers 34 and 35, the axes of which extend in parallel to each other and perpendicularly to the plane of the frame 25 for guiding the tape 15 past a cutting station to be described below. The right-hand run of the belt 33 moves upwardly while the left-hand run of the belt 33 moves downwardly. The rollers 34 and 35 have the same diameter and are arranged vertically one above the other. The arrangement is such that the press down roller 27 drives the conveyor belt roller 35 and thus the belt 33 through a magnetic clutch 36 and through a gear belt 36a. The rotational speed of the rollers 34 and 35 is so selected that the speed of the tape 15 and the speed of the conveyor belt 33 is the same during the dispensing and applying, especially along the downward run of the conveyor belt 33 between the roller pair 30 and 34 on the one hand, and the roller pair 31 and 32 on the other hand.

The cutting mechanism comprises a cutting counter rail 41 rigidly secured to the frame 25 and a cutting bar 46 also secured to the carrier frame 25 by mounting brackets 37 and 38 equipped with drive means such as pneumatic piston cylinder devices 39 and 40 for pressing the cutting bar 46 against the tape to be severed. The journal ends of the cutting bar 46 are rotatably supported in slide bearings 43, 44 carried by the brackets 37 and 38. The piston cylinder devices 39 and 40 are effective on the slide bearings 43, 44 for moving the knife bar 46 into the cutting position. The knife bar 46 is rotatably mounted in the slide bearings 43 and 44. A drive member 50 operatively connected to the knife bar 46 can rotate the knife bar 46 in 90° steps for the selection of any one of different knives 47, 48, and 49. These knives are secured to sides of the knife bar 46 which has an approximately square cross-section.

The tool support 51 is rigidly secured to the frame 25, whereby the support 51 and the frame 25 form a unit carrying the tools and the supply reel 26, as well as take-up reels 56 and 57 to be described below. The entire unit is movably secured to the adapter 54 for connection to a robot arm not shown. The intermediate member 53 is arranged between the adapter 54 and the tool support 51, whereby guide bars 52 and springs 55 function in the same way as has been described above for compensating for an uneven surface on a structural component 21. The entire unit 25, 51 is movable against the force of the spring toward the intermediate carrier 53.

The sequence of work steps performed by the apparatus of FIGS. 5 and 6 is substantially the same as that described above with reference to FIGS. 1 to 4. The robot arm will move the dispenser of FIGS. 5 and 6 in a dispensing direction from right to left, whereby impregnated tape will be withdrawn from the supply reel 26. Certain deviations of the surface of the work piece to which the tapes are to be applied, from a level plane, will be accommodated by the springs 55. Two take-up rollers 56 and 57 are provided for handling tapes 15 having a backing strip as well as a protective film. The rollers 56 and 57 are located as shown. The protective film will be separated from tape 15 prior to reaching roller 29 and will be led by roller 57' to roller 57.

When it becomes necessary to sever the tape at a location determined by a control program, the dispensing operation is automatically stopped when the predetermined cutting location has reached the respective knife 49. Then, the pneumatic cylinders 39 and 40 are operated to firmly press the knife 49 against the tape 15, whereby the endless belt 33 which is made of a suitable elastic material, provides a required backing for the cutting operation because the belt 33 can bear against the counter cutting rail 41. Since the selectable knives 47, 48, 49 have different angular slants relative to the travel direction of the tape 15, it is possible to make angular cuts with respective slants.

In those instances where the tape 15 does not have any backing strip nor any protective film, the tape 15 will adhere to the conveyor belt 33 because the resin in the tape 15 has not yet been cured. However, this adhesion between the tape 15 and the belt 33 is easily removed again when the tape 15 and the belt 33 come into the zone of the two rollers 32 and 35 which apply a peeling action. This peeling action is sufficient for again separating the tape 15 from the endless belt 33 without the need for any shearing forces.

FIG. 7 shows the mounting bracket 38 with the piston cylinder device 40 for moving the slide bearing 44 shown in FIG. 5 horizontally back and forth, whereby the slide bearing 44 is guided in the guide slot 38a in the bracket 38. A journal end 45 of the knife bar 46 is rotatably received in the slide bearing 44 for rotating the knife bar 46 with the aid of a drive member such as a pneumatic piston cylinder device 50a, the piston rod of which is connected to a toothed rack 50b cooperating with a gear wheel or pinion 50c connected to the lower end of the knife bar 46. Thus, operation of the piston cylinder device 50a in accordance with a manual or program selection, will rotate the knife bar 46 in 90° steps.

FIG. 8 shows the upper mounting bracket 37 with the cylinder 39 which operates the slide bearing 43 through its piston rod 42. The upper journal end or stud 47 of the knife bar 46 is rotatably mounted in the slide bearing 43.

FIGS. 9 and 10 illustrate a dispenser similar to that described above with reference to FIGS. 5 and 6, however, with a modified cutting mechanism which permits continuing the tape motion during the cutting operation. The carrier frame 25 again supports the conveyor with its endless belt 33 on rollers 34 and 35 and guide rollers 29 and 30. A plurality of knife rollers 58, 59, 60 and 61 are rotatably mounted to a bracket extension of the carrier frame 25. The cylindrical jacket surfaces of these knife rollers carry helically curved knives 62, 63, 64, and 65. Counterholding or support rollers 66, 67, 68, and 69 are also rotatably mounted to the frame 25 in positions for cooperation with the respective knife roller or cylinder and for cooperation with the endless belt 33. The knife cylinders 58, 59, 60, and 61 are driven in unison by a pully 70 through a drive belt 71 driving the driven shaft 72 carrying a gear wheel 73. The drive of the shaft 72 is transmitted to the roller 58 through a magnetic clutch 74. A pinion 75 transmits the rotation of the gear wheel 73 to a further gear wheel 76 driving the knife cylinder 59 through a further magnetic clutch 77. Similarly, the rotation of the gear wheel 76 is transmitted to the gear wheel 78 for driving the knife roller or cylinder 60 through a magnetic clutch 80. The rotation of the gear wheel 78 is transmitted to the gear wheel 79 for rotating the knife roller or cylinder 61 through the magnetic clutch 81.

The drive train 70 to 79 may be continuously driven, for example, by a motor 70'. However, the individual knife cylinders 58, 59, 60, and 61 are selectively driven, for example, in response to a program taking the tape width into account. For this purpose each magnetic clutch has its own individual energizing circuit 74', 77', 80', and 81' operatively connected to the control computer. The knives 62, 63, and 64 cover a sufficient circumferential, helical length around the surface of the respective knife cylinder so that one revolution of the respective knife cylinder is sufficient to sever the tape. Thus, each magnetic clutch is stopped when the respective knife cylinder has made one revolution. For this purpose, knife cylinder operated switches 82, 83, 84, and 85 are arranged for interrupting the energization of the respective magnetic clutch in response to the rotation of the respective knife cylinder. For this purpose, each switch is equipped with a sensor 86. Only one sensor is shown for the switch 85. The sensor 86 reaches into a recess 87 on the circumference of the respective knife cylinder. The contacts of the switches 82, 83, 84, and 85 are brake-before-make contacts so that the energizing circuit for the respective magnetic clutch is each time prepared to be energized by an energizing signal from the control program and so that the energization may be interrupted when the respective knife cylinder has made its cutting revolution. The operation of the energizing circuits 74', 77', 80', and 81' is synchronized with the switch actuation by the knife cylinders.

Although the invention has been described with reference to specific example embodiments, it will be appreciated that it is intended to cover all modifications and equivalents within the scope of the appended claims.

What we claim is:

1. A robot system for dispensing and laminating a preimpregnated tape onto a structural component, comprising a robot having a cantilevered arm with a free end and tiltable about a plurality of axes, carrier frame means (1) for carrying a tape supply roller, a work performing unit (5, 51) connected to said carrier frame means, adapter means (2, 54) connected to said carrier frame means for securing said work performing unit as an attachment to said free end of said arm of said robot, said work performing unit comprising feed roller means for advancing said tape, cutting means for cutting off portions of said tape, support means for supporting said feed roller means and said cutting means to form said work performing unit, said system further including guiding mounting means for mounting said support means relative to said carrier frame means in a support movement guiding manner, elastically yielding biasing means operatively interposed between said guiding mounting means and said support means for elastically opposing any movement of said work performing unit (5) toward said carrier frame means (1), whereby said biasing means maintain a defined spacing between the work performing unit (5, 51) and said carrier frame means (1), so that a contact pressure of said feed roller means on said tape is adjustably determined through said biasing means in response to a respective movement of said arm of said robot system, and control signal responsive drive means arranged for operating said robot system in response to a control program, and wherein said cutting means comprise a tiltably mounted knife carrier and a rotatable knife disk mounted to said knife carrier, said control signal responsive drive means comprising a tilting drive member connected to said knife carrier for tilting the knife carrier from a rest position into a working position and vice versa, whereby said knife disk is moved in a direction extending across a direction defined by said tape, said cutting means further comprising knife counter means arranged for cooperation with said knife disk when said knife disk is in said working position.

2. The robot system of claim 1, wherein said tape comprises a backing strip, said device further comprising take-up roller means rotatably mounted to said support means for rolling up said backing strip as said tape is being dispensed.

3. The robot system of claim 1, wherein said fixed member is said carrier frame (25).

4. The robot system of claim 1, wherein said fixed member is an intermediate mounting member (53).

5. A robot system for dispensing and laminating a preimpregnated tape onto a structural component, comprising a robot having a cantilevered arm with a free end and tiltable about a plurality of axes, carrier frame means (1) for carrying a tape supply roller, a work performing unit (5, 51) connected to said carrier frame means, adapter means (2, 54) connected to said carrier frame means for securing said work performing unit as an attachment to said free end of said arm of said robot, said work performing unit comprising feed roller means for advancing said tape, cutting means for cutting off portions of said tape, support means for supporting said feed roller means and said cutting means to form said work performing unit, said system further including guiding mounting means for mounting said support means relative to said carrier frame means in a support movement guiding manner, elastically yielding biasing means operatively interposed between said guiding mounting means and said support means for elastically opposing any movement of said work performing unit (5) toward said carrier frame means (1), whereby said biasing means maintain a defined spacing between the work performing unit (5,51) and said carrier frame means (1), so that a contact pressure of said feed roller means on said tape is adjustably determined through said biasing means in response to a respective movement of said arm of said robot system, and control signal responsive drive means arranged for operating said robot system in response to a control program, and wherein said cutting means comprise a knife bar carrying a plurality of knives for cutting said tape across its length, means mounting said knife bar for rotation about its longitudinal axis for selecting any one of said knives for cutting said tape, knife counter means arranged for cooperation with a selected one of said knives, means connected to said knife bar for driving said knife bar against said knife counter means, said cutting means further comprising conveyor means including an elastic endless conveyor belt mounted for passing between said knife bar and said knife counter means, whereby said tape passes between said elastic endless conveyor belt and said knife bar so that the fiber band is severed by said selected knife penetrating partially into said elastic endless conveyor belt running, in a dispensing direction, with a tape contacting conveyor belt run for protecting a knife edge.

* * * * *